US006605819B2

(12) United States Patent
Ross

(10) Patent No.: US 6,605,819 B2
(45) Date of Patent: Aug. 12, 2003

(54) MEDIA VALIDATION

(75) Inventor: Gary A. Ross, Colinsburgh (GB)

(73) Assignee: NCR Corporation, Dayton, OH (US)

( * ) Notice: Subject to any disclaimer, the term of this patent is extended or adjusted under 35 U.S.C. 154(b) by 117 days.

(21) Appl. No.: 09/826,679

(22) Filed: Apr. 5, 2001

(65) Prior Publication Data

US 2001/0043140 A1 Nov. 22, 2001

(30) Foreign Application Priority Data

Apr. 28, 2000 (GB) ........................................... 0010264

(51) Int. Cl.[7] ............................................. G06K 7/10

(52) U.S. Cl. .................. 250/556; 250/559.11; 250/239; 382/7

(58) Field of Search ............................ 250/556, 223 R, 250/239, 205, 559.11, 559.16, 557, 226; 382/135, 137, 7, 17, 18; 356/71, 434, 435; 194/206-207; 209/534

(56) References Cited

U.S. PATENT DOCUMENTS

| | | | | | |
|---|---|---|---|---|---|
| 4,587,434 | A | * | 5/1986 | Roes et al. | 250/556 |
| 4,592,090 | A | * | 5/1986 | Curl et al. | 382/135 |
| 5,304,813 | A | | 4/1994 | De Man | |
| 5,370,114 | A | * | 12/1994 | Wong et al. | 600/322 |
| 6,050,387 | A | * | 4/2000 | Iwaki | 194/207 |
| 6,101,266 | A | * | 8/2000 | Laskowski et al. | 382/135 |
| 6,257,389 | B1 | * | 7/2001 | Paping et al. | 194/207 |

FOREIGN PATENT DOCUMENTS

| | | | | | |
|---|---|---|---|---|---|
| EP | 0537513 | | | 4/1993 | |
| GB | 1470737 | | | 4/1977 | |
| GB | 2029007 | A | * | 3/1980 | G01M/19/00 |
| GB | 1600962 | | | 10/1981 | |
| GB | 2107911 | | | 5/1983 | |
| GB | 2122743 | A | * | 1/1984 | G01N/21/17 |
| GB | 2272762 | | | 5/1994 | |
| GB | 2309299 | | | 7/1997 | |
| WO | 9821697 | | | 5/1998 | |

* cited by examiner

*Primary Examiner*—Kevin Pyo
*Assistant Examiner*—Seung C. Sohn
(74) *Attorney, Agent, or Firm*—Francis L. Conte

(57) ABSTRACT

A method of validating selected properties of media includes: providing a sensor having a monochromatic light source and a light detector, with the detector being positioned to receive only diffusely reflected light from the source; locating the media in the path of the sensor; activating the light source, and detecting light diffusely reflected from the media to provide an output from the detector containing data relating to the response of the media to the light source; moving the media with respect to the sensor so as to gather sample data from different areas of the media; processing the sample data to determine a selected characteristic of the media; and comparing the sample data against a reference database of data obtained from genuine media.

28 Claims, 3 Drawing Sheets

MEDIA VALIDATION

BACKGROUND OF THE INVENTION

The present invention relates to an apparatus and a method for acquiring and processing spectrographic information, particularly of moving media, and for the recognition, validation, and screening of such media. The invention has particular application in the field of self-service terminals (SSTs) and in recognition of banknotes and similar media, and detection of forgeries. In its broader aspects the invention has application in verifying or confirming the source or validity of other items or products.

A growing number of financial and similar transactions are carried out by means of self-service terminals (SSTs) such as automated teller machines (ATMs). Many transactions involve the deposit of media, such as banknotes, into the SST to pay for some service or product, or simply to credit the deposit to a user's bank account. Therefore, such SSTs require a media recognition mechanism to recognize and determine the value of the deposited media, and to validate the media and detect forged or inappropriate media, such as forged banknotes or foreign currency. Screening of media to identify worn, dirty, or damaged media may also be desirable, so that such media may be separated from clean media and removed from circulation.

A number of systems currently exist for media recognition, validation and screening, but these are generally complex and expensive, requiring high-density images to be taken of the media, and may experience difficulties in handling media at the relatively high speeds necessary for real-time processing of banknotes within an SST, and so may extend the time taken to complete a transaction by an unacceptable degree.

Other systems are available that are low-cost, but these systems may only be used with a single type of currency or with a small set of currency types.

SUMMARY OF THE INVENTION

It is among the objects of embodiments of the present invention to obviate or alleviate these and other disadvantages of existing media validation systems. This may be achieved in part by making use of the optical properties of banknotes, in particular the complex color printing and patterns used on genuine banknotes.

According to a first aspect of the present invention, there is provided a method of validating selected properties of media, the method comprising the steps of:

a) providing a sensor apparatus comprising a monochromatic light source and a light detector, whereby the detector is positioned to receive only diffusely reflected light from the source;

b) locating an item of media in the path of the sensor apparatus;

c) activating the monochromatic light source, and detecting light diffusely reflected from the media, to provide an output from the detector containing data relating to the response of the media to said light source;

d) moving the media with respect to the sensor apparatus;

e) repeating step c) and optionally step d) at least once, so as to gather sample data from different areas of the media;

f) processing the sample data to determine a selected characteristic of the media; and g) comparing the sample data against a reference database of data obtained from genuine media.

The above method may be utilized to rapidly and simply generate a data sample from the media characteristic of the media's reflectivity at a single wavelength of light. "Light" in this context may mean any electromagnetic radiation, and not only visible light. For example, infra-red or ultraviolet light may be used. Similarly, any reference made herein to a particular "color" of light is to be understood as referring to light of a particular wavelength or band of wavelengths. Thus, a reference to "colored light" may refer for example to green light or to infra-red electromagnetic radiation.

Preferred embodiments of the invention may be used for recognition and validation of banknotes, for example, when such banknotes are entered into an ATM. For example, an ATM adapted to perform the method of the present invention may be provided with a light source and detector arranged as described herein, such that the path of a banknote entered into the ATM (the 'test sample') passes before the sensor apparatus. The light source is activated, and diffusely reflected light from the banknote is detected by the detector, which provides an output containing data relating to the response of the banknote to the light source.

The banknote is then moved a step further into the ATM, and a second sample taken of reflected light. This continues until several samples have been taken, yielding data characteristic of a stripe across the banknote.

The sample data is then compared in a 'recognition search' against a reference database of data obtained from a range of denominations of banknotes; if the sample data matches data from a particular denomination of banknote, the test sample is identified as being of that denomination. Each denomination and source of banknotes will typically have a characteristic monochromatic sample profile across a particular stripe of the banknote.

Preferably, the media is moved linearly with respect to the sensor apparatus, such that the sample data is representative of a 'stripe' across the media.

The method may further comprise the step of determining a linear dimension of the media. This enables the recognition search to be greatly simplified since a test sample need only be compared against reference samples of the same linear dimension, rather than all reference samples. That is, once a test sample has been rejected against a particular reference dataset as having different linear dimensions, there is no need to compare the actual data values of the two samples to reject the possibility of a match between the two samples. Preferably, the linear dimension of the media is determined according to the number of individual "frames" of data in the sample data, as this data is readily available from the sample data.

According to a second aspect of the present invention, there is provided a method of validating selected properties of media, the method comprising the steps of:

a) providing a sensor apparatus comprising a plurality of distinct monochromatic light sources and a light detector, whereby the detector is positioned to receive only diffusely reflected light from the sources;

b) locating an item of media in the path of the sensor apparatus;

c) activating a first monochromatic light source, and detecting light diffusely reflected from the media, to provide an output from the detector containing data relating to the response of the media to said light source;

d) moving the media with respect to the sensor apparatus;

e) activating another monochromatic light source, and detecting light diffusely reflected from the media, to provide an output from the detector containing data relating to the response of the media to said light source;

f) repeating steps d) and e) at least until each distinct monochromatic light source has been activated;

g) processing the sample data to determine a selected characteristic of the media; and h) comparing the sample data against a reference database of data obtained from genuine media.

This aspect of the present method generates sample data comprising information from a plurality of wavelengths of light (for example, red, green and blue). This extra data may be used for more rigorous analysis of the sample than that provided by data obtained from light of a single wavelength.

In a variant of the invention, additional light source activation steps may be included prior to movement of the media; for example, data from each wavelength of light may be taken at a single 'spot' on the media, the media may be moved, and a further set of data readings taken at a second 'spot'.

Preferably each distinct monochromatic light source is activated in a predetermined sequence. This ensures that the sample data is consistent across different samples, and may be readily compared.

In a preferred embodiment of the present invention, media identification and validation may be performed as separate steps. The initial identification of the media may make use of the data relating to the response of the media to a single wavelength of light only, for identifying the type of media (for example, denomination of banknote). Subsequent validation of the media may however comprise the additional step of comparison of data relating to the response of the media to a plurality of wavelengths of light against a reference database of data obtained from genuine media. Since the database size, and hence the time required to perform a comparison, will be greater for multi-channel data than single channel data, the initial identification of the type of media under scrutiny may be used to restrict the reference database to be searched to, for example, a specific denomination of banknote, prior to validation of the media with reference to multi-channel data. This technique is further preferred as media identification need be less rigorous than media validation, since a higher proportion of false positives or negatives may be tolerable at the identification stage than the validation stage.

The comparison of sample data and reference data may take the form of comparison of measured light levels for each wavelength of light directly, without further processing of the data; alternatively, or in addition, differences between measured light levels for pairs of wavelengths of light may be compared. For example, the difference between red and infra-red responses may be compared for the test and reference samples. Such a comparison may prove to be more resistant to variations between the same type of banknotes, and so provide a more robust method. Numerous other data comparison techniques may be used, as will be apparent to those of skill in the art.

In one embodiment, the comparison of sample data against reference data makes use of a Bayesian classifier algorithm, although any other robust pattern matching technique may be used. This technique is preferred when the data comparison is for purposes of identification of media only.

Alternatively, or in addition, the comparison of sample data against reference data makes use of a spatially dependent discrimination algorithm, giving greater weighting to some areas of the media than others. This embodiment is particularly preferred when validation of media is being conducted. This is to take account of the fact that certain parts of many media, particularly banknotes (for example, the Treasury Seal on US Dollar bills) are significantly more difficult to forge than other parts of the notes.

Preferably, the method further comprises the additional steps of:

normalizing the sample data with respect to the reference data for the same type of media; and determining the condition of the media by reference to the degree of normalization required.

As a broad generalization, the degree of normalization required is proportional to the amount of degradation of the media. A layer of dirt on the media approximates a neutral density filter, which attenuates but does not distort the color information. These additional steps enable the method of the present invention to validate and identify dirty, worn or damaged banknotes with greater reliability than if no normalization is used. Further, the method may also be used to determine the degree of degradation of a banknote (by determination of the degree of normalization required), and so, for example, separate badly damaged notes from other notes, for removal from circulation.

According to a third aspect of the present invention there is provided an apparatus for sensing selected properties of media, the apparatus comprising a monochromatic light source, a light detector, and means for location of media in the path of the detector, whereby the detector is positioned so as to receive only diffusely reflected light from media located in the path of the detector.

It is desirable that the detector not receive light directly reflected from the media or transmitted directly from the light source to the detector, as such light does not contain any spectral information regarding the media to be detected. That is, such light corresponds solely to the emitted light, whereas diffusely reflected light contains information dependent on properties of the reflecting body.

Preferably, the source and detector are located within a holder. Conveniently, the source and detector are located within a plastic holder; although numerous other suitable materials will be apparent to those of skill in the art. It is preferred that the holder is of a light-absorbing material, to reduce possible problems arising from reflection of the light source. Conveniently also the holder is in the form of a planar disc.

Preferably, the light source and light detector are directed towards the same side of a plane. Preferably also the direction in which the light is emitted by the light source is at an acute angle with respect to the direction in which the light detector is directed. The preferred angle between the light source and detector is dependent on the spacing of the source and detector relative to the media; the preferred embodiment of the present invention has a vertical spacing of 9 mm between the detector and the media, and an angle of 60° between the light source and detector.

Preferably, a plurality of distinct monochromatic light sources are provided. Conveniently, four distinct monochromatic light sources are provided. In a preferred embodiment of the invention, separate red, green, blue and infra-red light sources are provided. Preferably the light sources are arranged around the detector. Preferably the detector is equidistant from each of the light sources, at a central location. Conveniently also, each monochromatic light source comprises paired monochromatic light sources; most preferably, the members of each pair are diametrically opposed.

Preferably, each light source is a light emitting diode (LED).

Preferably, the light detector is a photodiode.

According to a fourth aspect of the present invention, there is provided a system for sensing selected properties of media, the system comprising a monochromatic light source, a light detector, and means for location of media in the path of the detector, whereby the detector is positioned so as to receive only diffusely reflected light from media located in the path of the detector, means for generating a timing signal, means for activating each light source in synchrony with the timing signal, means for recording signals from the light detector, and means for processing the recorded signals.

In a preferred embodiment of the invention, the system comprises a plurality of distinct monochromatic light sources, and the means for activating the light sources comprises means for activating each distinct monochromatic light source in turn in a specified sequence.

Preferably, the system further comprises means for moving an item of media with respect to the detector. Conveniently this means may comprise one or more rollers for moving the media. Alternatively, conveyors, slides or the like may be used. Preferably also, the system further comprises means for detecting the edges of the item of media. Preferably, the system still further comprises means for commencing and ceasing recording of signals on detection of the edges of the item of media. Conveniently, the edge detection means comprises one or more photosensors disposed in the path of the item of media; alternatively, means such as physical edge detectors, electrical resistance sensors, or the like may be used.

Preferably also, the means for moving an item of media comprises means for generating a signal after the moving means has moved through a predetermined distance. For example, where the moving means comprises a roller, the roller may generate a signal on each revolution. Preferably also, the signal is communicated to the timing means; more preferably the timing means includes a phase locked loop (PLL) circuit. This ensures that each sample reading is taken at regularly spaced intervals, regardless of system speed or variations in transport speed, so compensating for irregular movement of the media, and ensuring that the data collected from each test sample is consistent across different media. The phase lock loop ensures that timing signals to activate each light source are generated at intervals corresponding to movement of the moving means through a predetermined distance; and is preferably used in combination with a conventional timing device such as a clock circuit, which controls activation of each light source for a fixed time interval.

Preferably, the system further comprises means for orienting an item of media to a particular orientation with respect to the sensing apparatus. This may conveniently be an arrangement of guides, preventing insertion of media into the system in an incorrect orientation. Alternatively, or in addition, the orientation means may comprise an arrangement of guides for holding and turning a media item into a preferred orientation.

In one embodiment of the invention, the system may comprise two detectors, disposed so as to give readings from opposed faces of an item of media. This ensures that a large amount of available data may be collected on a single pass of the media.

According to a fifth aspect of the present invention, there is provided a self-service terminal (SST), comprising a system for sensing selected properties of media, the system comprising a monochromatic light source, a light detector, and means for location of media in the path of the detector, whereby the detector is positioned so as to receive only diffusely reflected light from media located in the path of the detector, means for generating a timing signal, means for activating each light source in synchrony with the timing signal, means for recording signals from the light detector, and means for processing the recorded signals.

BRIEF DESCRIPTION OF THE DRAWINGS

These and other aspects of the present invention will now be described by way of example only, and with reference to the accompanying figures, in which.

DETAILED DESCRIPTION

Figure 1A:
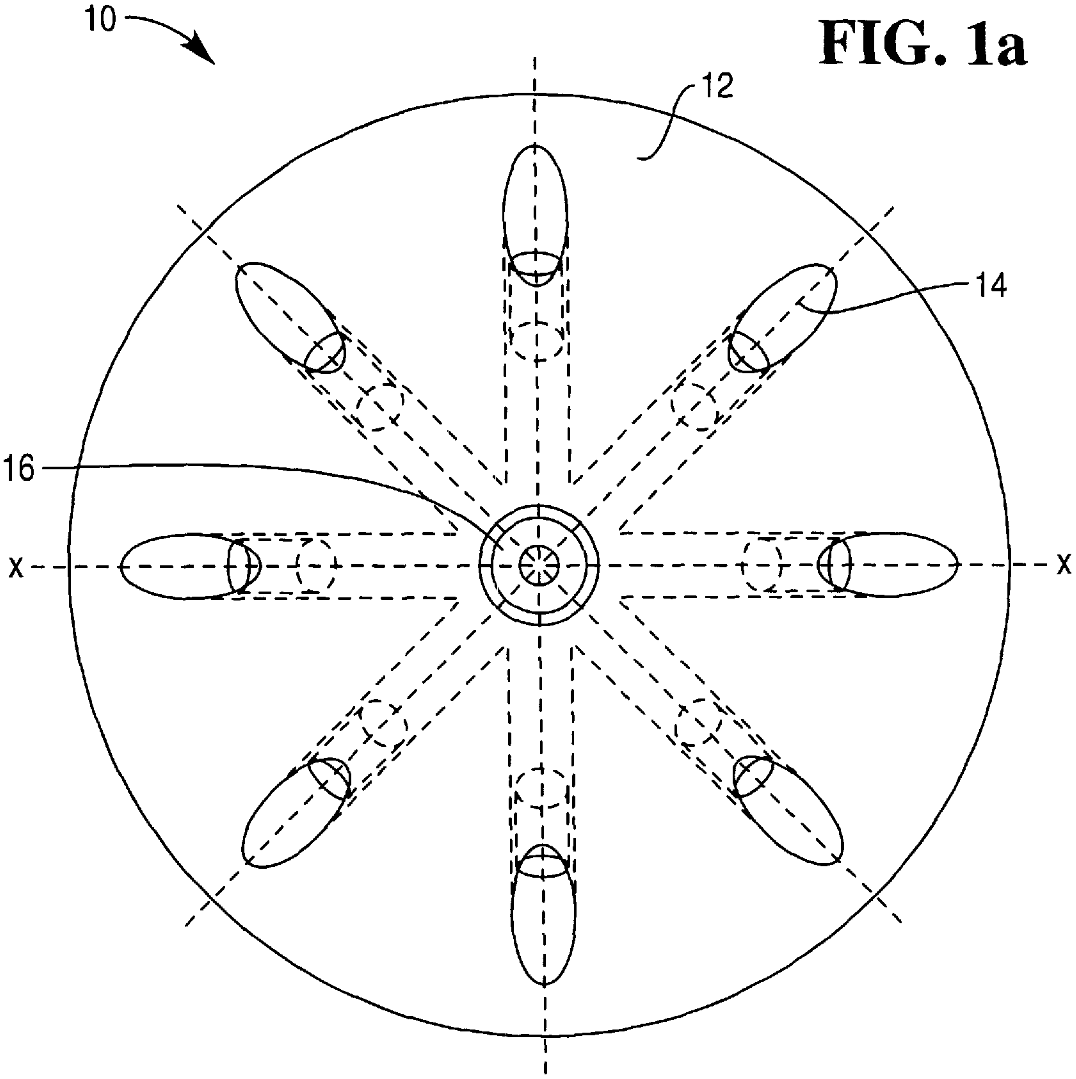
FIGS. 1*a* and 1*b* show a sensor apparatus for detecting characteristics of media, in accordance with an embodiment of the present invention, in plan and side views respectively.

Before describing the Figures in detail, the overall function and performance of apparatus in accordance with embodiments of the present invention will be described. The apparatus may be used, among other purposes, for the identification and validation of valuable media, such as banknotes.

A sensor head is provided, which includes a photosensor and four paired LEDs, two each producing light of red, green, blue, and infra-red wavelengths. A banknote to be tested is located in the path of the sensor head, and a first pair of LEDs (for example, the red pair) is activated. A spot on the banknote is illuminated, and the intensity of diffusely reflected red light is detected by the photosensor, and recorded in a computer processor memory. The note is then moved forward a short distance, and the second pair of LEDs is activated. This is repeated until the whole length of the banknote has been illuminated. Each illumination is performed after the note has moved through a specified distance; and the duration of each illumination is controlled by a timer incorporated in the system.

The data thereby obtained possesses a number of important characteristics, which are of assistance in the operation of the present invention. The number of sample points taken along a banknote is indicative of the physical length of the banknote; and due to the sequential nature of the sampling in each color, the complete multi-channel sample data may be straightforwardly processed to obtain single-channel sample data when desired.

After the sample data has been acquired, it is passed to a processor for analysis. The processor includes a database of reference data from a number of genuine reference banknotes of the denominations and issues which it is desired that the apparatus is able to accept and process.

Firstly, the physical length of the banknote is determined from the sample data, and compared against the length of each candidate match in the reference database. Any reference banknote which is of a different length to the test sample is not a match, and may therefore be discarded from further consideration, without having to be included in subsequent analysis.

After this step has been taken, the content of the sample data is then analyzed. Data from a single channel (for example, blue) is extracted from the sample data, and compared against equivalent single-channel reference data, by means of a Bayesian classifier algorithm or similar, as will be described below.

Once this algorithm provides a match between the sample data and reference data, the test banknote is taken as being identified as a note of that particular denomination and issue. However, identification is not equivalent to validation, since, for example, a forged 10 pound note may be identifiable as a 10 pound note despite not being a genuine banknote. If no match is found, the note is rejected as unidentifiable.

The third step of validation is then undertaken. This compares data from all four channels of the test sample with equivalent data from the particular reference sample identified in the previous step. The comparison is performed in a manner which will be described below; if the test sample matches the reference sample, the note is validated as being genuine, otherwise the note is rejected.

This three-stage identification and validation process results in successively smaller groups of reference data to be matched as the quantity of information being compared in each reference sample increases. Thus, the present invention may be used to provide an accurate identification and validation of media, with only relatively low processing power being required.

Particular aspects of embodiments of the invention will now be described, with reference to the Figures.

Figure 1B:
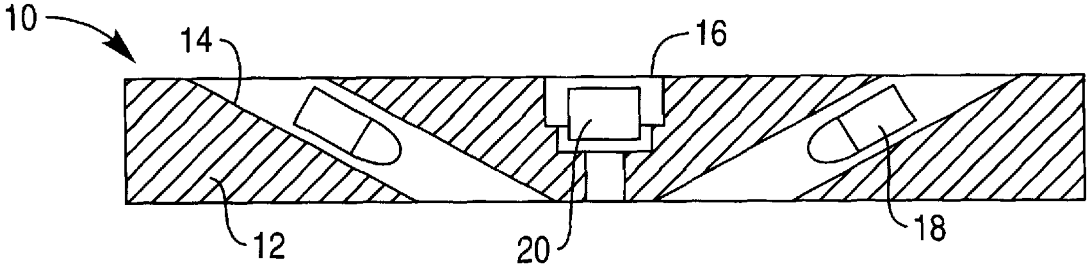

Referring first of all to FIGS. 1_a_ and 1_b_, these show a sensing apparatus, referred to as a sensing head, in accordance with one aspect of the present invention. The sensing head 10 comprises a plastic disc 12, within which are provided a number of apertures 14, 16. As can be seen from FIG. 1_b_, which is a cross-section view along the line X—X of FIG. 1_a_, the outer apertures 14 are provided through the disc 12 at an angle of 60° to the vertical center line of the sensor head. Eight peripheral apertures 14 are provided, equidistantly spaced around a central aperture 16.

Mounted within each peripheral aperture 14 is a light emitting diode (LED) 18, with the light source being directed toward the center line of the disc 12. Four different colors of LED 18 are used, red, green, blue and infra-red, with diametrically opposite LEDs 18 being of the same color.

Mounted within the central aperture 16 is a photodiode 20, with the detector disposed toward the same side of the disc 12 as the light sources of the LEDs 18.

Figure 2:
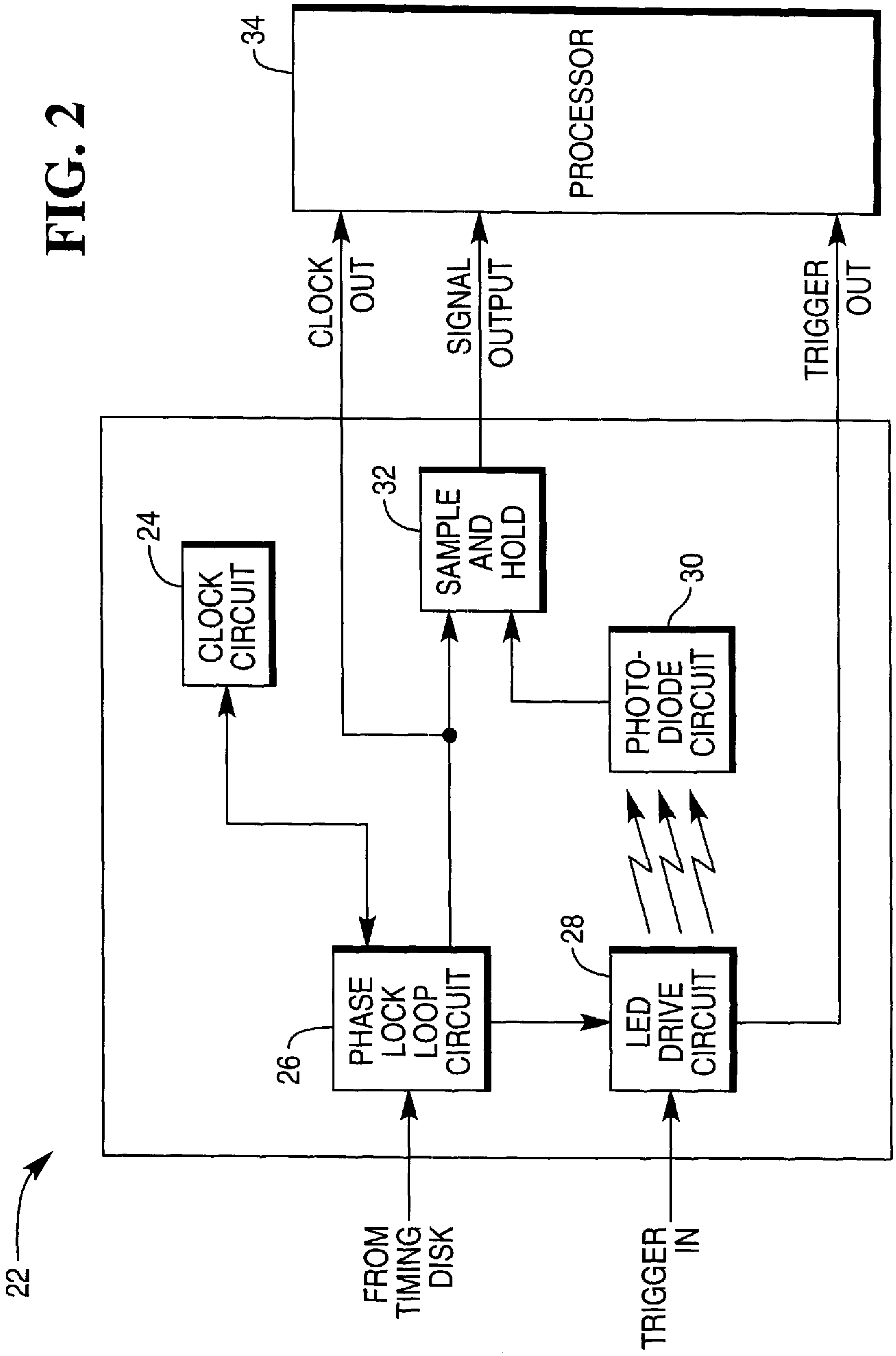
FIG. 2 shows a schematic of a circuit arrangement, to be used in conjunction with the apparatus of FIG. 1, in accordance with a further aspect of the present invention.

FIG. 2 shows a control circuit with which the sensor head 10 of FIG. 1 may be used. The circuit 22 includes a clock circuit 24, a phase lock loop circuit (PLL) 26, an LED drive circuit 28, a photodiode circuit 30, a sample and hold device 32, and a processor 34. External inputs are provided to the phase lock loop 26 from a timing disk, which generates timing signals based on the movement of a media transport system; and to the LED drive circuit 28 from sensors detecting the start and end of each item of media.

The clock 24 and PLL 26 interact to drive the LEDs such that each pair of LEDs is pulsed in turn for a fixed time period, with the intervals between pulses varying, dependent on the transport speed of the media. That is, the pulses are generated as the media moves through equal distances, not necessarily at equal time intervals. This ensures that the distance between each sample taken is fixed; the duration of each pulse must be fixed to allow each LED to fully activate on each pulse.

Figure 3:
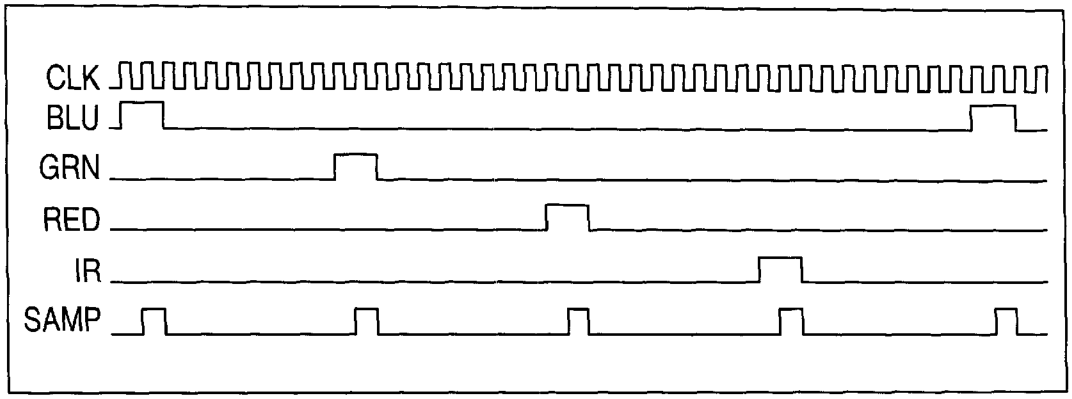
FIG. 3 shows a timing and sample diagram as may be produced by the system of FIG. 2.

The sample and hold device 32 takes a sample on each pulse of the LEDs. This yields a pulse train containing information on the response of the media to all four frequencies of light. A diagram of the signal pattern is shown in FIG. 3; it can be seen that each LED pulse lasts for two clock cycles, while each sample is taken only from the second cycle of each pulse, so ensuring that the LED is fully activated before sampling.

The sample train is passed to the processor 34 for analysis. A representative graph of the signals from one banknote is given in FIG. 4, which illustrates the varying intensity of response which is obtained over the length of a banknote at each of four wavelengths of light. It can be seen that this data thereby provides a complex 'fingerprint' of a banknote, which may be used in identification and validation of such notes.

Figure 5:
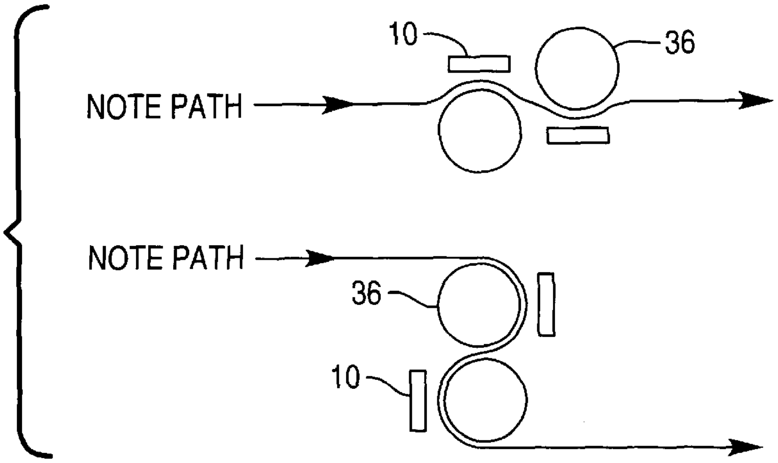
FIG. 5 shows a sketch of example media transport systems as may be used in conjunction with embodiments of the present invention.

To sample data from both sides of a banknote simultaneously, the transport arrangements shown in FIG. 5 may be used. Each of these consists of a pair of rollers 36 across which a media item may pass, with paired opposed sensor heads 10 disposed to capture both faces of the media. This ensures that, should it be necessary to rely upon a particular feature found only on one side of a banknote (for example, the Queen's head) to identify the note, the required data will have been acquired in a single pass of the note through the mechanism. Related systems incorporating other configurations of rollers may be used in other embodiments of the present invention, to flatten a portion of the banknote being tested at the point being sampled, to obtain consistent data between banknotes and to reduce the effects of crumpling and folding.

Figure 4:
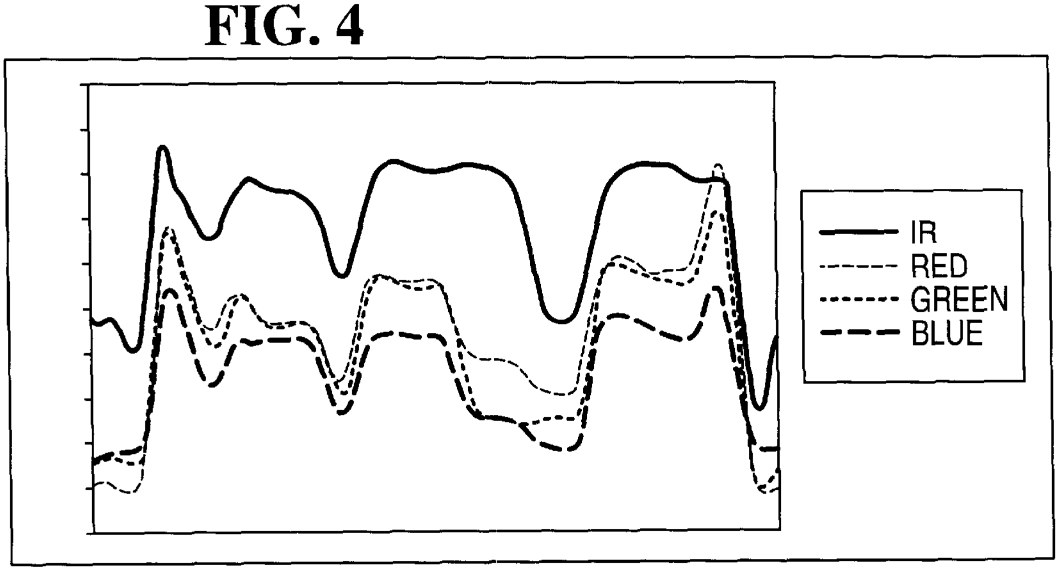
FIG. 4 shows a sample output from a sensing system in accordance with an embodiment of the present invention.

The data given in FIG. 4, taken from a single stripe across a banknote in four channels, may be processed in a number of ways to analyze the media.

A database of known media information is necessary for testing of the test media sample to occur. This database may consist of data acquired in the same way as described above for each type of media to be analyzed. For example, the database may be generated by recording data from a number of known genuine banknotes passed through the detection system as if they were test samples. Depending on the tolerance of the system, data from a number of stripes across each media type may be necessary, which should also be taken in a number of different media orientations. For example, if the orientation of an entered banknote is not fixed by the construction of the apparatus, then it may be necessary to identify a test banknote entered in a number of different orientations. Alternatively, or in addition, the possible orientations and positions of entry of a test banknote may be limited by the apparatus to lower the size of reference database necessary to implement the invention.

Due to the nature of the system, and the size of each datapoint with respect to the note, the database can tolerate a certain amount of "skew" in each media item; that is, data taken from a strip of a banknote will not differ significantly from data taken from an adjacent strip of banknote 1 mm away, if the size of each point sampled is sufficiently large. However, if greater tolerance is desired, further data sets must be added.

In addition to the directly sampled data, each data set is also given a header indicating its size, and therefore also the physical size of the media (in number of sample points). This helps decrease search times, as will be explained below.

Sampled data is analyzed as follows. From the four-channel data, a single channel is selected for use in media recognition. The number of sample points in the sample data is taken, and all reference samples in the database of a different size are rejected immediately, without the need to compare the actual data.

The remainder of the candidate reference samples are then compared, using a single channel of data only, to the test sample. The comparison is performed using a Bayesian classifier, of the form:

$$L_j = \sum_i \frac{[x_j - \mu_{ij}]^2}{\sigma_{ij}^2}$$

$$\text{Class}=j \rightarrow L_j=\text{MIN}[L_j]$$

This calculates the log-likelihood of a sample belonging to a class by taking the distance to the mean for each class and scaling by the variance for that class. This is a common classifier for such sampling work.

The sample with the best fit to the test sample is taken as representing the type of media. If no good fit is obtained, the test sample is rejected as unrecognized.

After recognition of the test sample, the next stage is validation to distinguish genuine media from forgeries. Since the type of media has already been identified, it is only necessary to perform a validation test on reference samples of that particular type. Therefore the amount of data to be analyzed for validation is reduced by the previous identification stage. The validation occurs using all four channels of data, and compares the reference samples against the test sample, in a similar manner to that used for the recognition stage. Any suitably robust pattern matching algorithm may be employed, the preferred method being dependent on the exact task to be performed.

If the media is successfully validated, it may then be accepted. Otherwise, the media is rejected, despite having been recognized previously (by a less discriminatory algorithm).

Finally, the data set may also be used for determination of the media condition. Prior to validation, certain embodiments of the present invention may include the step of normalizing the test data to the level of the best-fit reference data; the degree of normalization required will give a crude measure of the condition of the media. Heavily worn or soiled media may be separated from fresh media, and removed from circulation. Alternatively, a normalization step may be included separately from the validation step, or indeed as a standalone process.

It can be seen from the foregoing description that the acquisition of high-quality data is desirable for the successful functioning of the present invention. The geometry of the sensor head shown in FIG. 1 is important for successful data collection. The angle of the direction of illumination of each LED at 60° to the vertical center line of the photodiode ensures that light will not be reflected directly from the test sample to the photodiode; rather, it is necessary for any light reaching the photodiode to be diffusely reflected. This is desirable as directly (specularly) reflected light contains no color information, being roughly identical with the emitted light irrespective of the reflecting surface. It is of course possible to make use of the present invention in the presence of both diffusely and directly reflected light, although the directly reflected light must be disregarded for the purposes of the invention. Thus, the sensor head of the present invention enables a high-quality data acquisition system to be constructed, using few, robust parts, and without the need for complex optics. This ensures that the sensor head may be mass produced relatively cheaply, and is thus suitable for media recognition and validation in a wide variety of roles. A particularly preferred role is in validation of media entered into a self-service terminal (SST), with the sensor head being located in the transport path of entered media, for detection of forged banknotes, and identification of denominations entered. However, the invention has wider application, and may be used in many such roles, as will be readily apparent to the skilled person.

What is claimed is:

1. A method of validating selected properties of media, the method comprising the steps of:

(a) providing a sensor apparatus comprising a plurality of distinct monochromatic light sources extending radially inwardly from a perimeter of a disc toward a common light detector which is positioned at a center of said disk to receive only diffusely reflected light from the sources;

(b) locating an item of media in a path of the sensor apparatus;

(c) activating a first monochromatic light source, and detecting light diffusely reflected from the media, to provide an output from the detector containing data relating to the response of the media to the light source;

(d) moving the media with respect to the sensor apparatus;

(e) activating another monochromatic light source, and detecting light diffusely reflected from the media, to provide an output from the detector containing data relating to the response of the media to the light source;

(f) repeating steps (d) and (e) at least until each distinct monociromatic light source has been activated;

(g) processing the sample data to determine a selected characteristic of the media; and (h) comparing the sample data against a reference database of data obtained from genuine media.

2. A method according to claim 1, wherein each distinct monochromatic light source is activated in a predetermined sequence.

3. A method according to claim 1, further comprising the steps of:

normalizing the sample data with respect to the reference data for the same type of media; and determining the condition of the media by reference to the degree of normalization required.

4. A method according to claim 1, wherein step (d) includes the step of moving the media linearly with respect to the sensor apparatus, such that the sample data is representative of a 'stripe' across the media.

5. A method according to claim 1, further comprising the step of determining a linear dimension of the media.

6. Apparatus for sensing selected properties of media located in a path, the apparatus comprising:

a number of monochromatic light sources extending radially inwardly from a perimeter of a disc for illuminating media in the path; and a common light detector positioned at a center of said disc for receiving only diffusely reflected light from media in the path.

7. Apparatus according to claim 6, wherein the light sources and light detector are directed towards the same side of a plane.

8. Apparatus according to claim 6, wherein each light source comprises a light emitting diode (LED).

9. A system according to claim 8, further comprising:

means for moving an item of media with respect to the detector; and means for generating a movement signal after the moving means has moved through a predetermined distance, wherein the movement signal is communicated to the timing means such that each light source is activated after the moving means has moved through the predetermined distance, regardless of time intervals between activations.

10. A system for sensing selected properties of media in a path, the system comprising:

a number of monochromatic light sources extending radially inwardly from a perimeter of a disc for illuminating media in the path;

a common light detector positioned at a center of said disc for receiving only diffusely reflected light from media in the path;

timing means for generating a timing signal;

means for activating each light source in synchrony with the timing signal;

means for recording outputs from the light detector; and means for processing the recorded outputs.

11. A system according to claim 10, wherein the light sources and light detector are directed towards the same side of a plane.

12. A system according to claim 10, wherein each light source comprises a light emitting diode (LED).

13. A self-service terminal comprising:

a system for sensing selected properties of media located in a path, the system including (i) a number of monochromatic light sources extending radially inwardly from a perimeter of a disc, (ii) a common light detector positioned at a center of said disc for receiving only diffusely reflected light from media located in the path, (iii) means for generating a timing signal, (iv) means for activating each light source in synchrony with the timing signal, (v) means for recording outputs from the light detector, and (vi) means for processing the recorded outputs.

14. A self-service terminal according to claim 13, further comprising:

means for moving an item of media with respect to the detector; and means for generating a movement signal after the moving means has moved through a predetermined distance, wherein the movement signal is communicated to the timing means such that each light source is activated after the moving means has moved through the predetermined distance, regardless of time intervals between activations.

15. A self-service terminal according to claim 13, wherein the light sources and light detector are directed towards the same side of a plane.

16. A self-service terminal according to claim 13, wherein each light source comprises a light emitting diode (LED).

17. A method of screening a banknote comprising:

illuminating a spot on said banknote with monochromatic light;

detecting intensity of light diffusely reflected from said spot;

moving said banknote to obtain a corresponding channel of data from detecting intensity of said diffusely reflected light from a plurality of said spots extending along a length of said banknote;

determining physical length of said note from said channel of data;

comparing said physical length against a reference database of lengths for genuine banknotes to determine a match therewith;

identifying denomination of said banknote from said reference database for said match; and validating said banknote from said reference database.

18. A method according to claim 17 further comprising:

illuminating successive spots on said banknote with a sequentially different monochromatic light for obtaining a plurality of corresponding different channels of data;

determining said physical length from a number of said spots illuminated from one of said data channels; and validating said banknote from a plurality of said data channels.

19. A method according to claim 18 further comprising:

extracting data from a single data channel and comparing said extracted single-channel data with said reference database to identify said denomination; and extracting data from multiple data channels and comparing said extracted multiple-channel data with said reference database to validate said banknote.

20. A method according to claim 19 further comprising:

aiming said different monochromatic light at a common spot in space; and moving said banknote to traverse said common spot and illuminate a single stripe across said length of said banknote.

21. A method according to claim 20 wherein each of said different monochromatic lights is aimed at said common spot atop said banknote in a pair with another one of said monochromatic lights in diametrically opposite directions.

22. A method according to claim 21 wherein said different monochromatic lights comprise four different colors alternating sequentially to form said single stripe.

23. A method according to claim 22 wherein said four colors are arranged in diametrically opposite pairs of the same color.

24. An apparatus for screening a banknote comprising;

means for illuminating a spot on said banknote with monochromatic light;

means for detecting intensity of light diffusely reflected from said spot;

means for moving said banknote to obtain a corresponding channel of data from detecting intensity of said diffusely reflected light from a plurality of said spots extending along a length of said banknote;

means for determining physical length of said note from said channel of data;

means for comparing said physical length against a reference database of lengths for genuine banknotes to determine a match therewith;

means for identifying denomination of said banknote from said reference database for said match; and means for validating said banknote from said reference database.

25. An apparatus according to claim 24 wherein:

said illuminating means are configured for illuminating successive spots on said banknote with a sequentially different monochromatic light for obtaining a plurality of corresponding different channels of data;

said determining means are configured for determining said physical length from a number of said spots illuminated from one of said data channels; and said validating means are configured for validating said banknote from a plurality of said data channels.

26. An apparatus according to claim 25 further comprising:

means for extracting data from a single data channel and comparing said extracted single-channel data with said reference database to identify said denomination; and means for extracting data from multiple data channels and comparing said extracted multiple-channel data with said reference-database to validate said banknote.

27. An apparatus according to claim 26 wherein said illuminating means comprise:

a disc having a plurality of diametrically opposite outer apertures surrounding a central aperture;

a plurality of light emitting diodes disposed in respective ones of said outer apertures for producing said monochromatic light; and a photodiode disposed in said central aperture.

28. An apparatus according to claim 27 wherein:

said outer apertures are inclined through said disc at an acute inclination angle for aiming said light emitting diodes at a common spot below said central aperture; and said central aperture is disposed coaxially in said disc for mounting said photodiode obliquely to said outer apertures.

* * * * *

UNITED STATES PATENT AND TRADEMARK OFFICE

CERTIFICATE OF CORRECTION

PATENT NO. : 6,605,819 B2
DATED : August 12, 2003
INVENTOR(S) : Gary A. Ross

It is certified that error appears in the above-identified patent and that said Letters Patent is hereby corrected as shown below:

Column 10,
Line 34, delete "monociromatic" and insert -- monochromatic --.

Signed and Sealed this

Second Day of December, 2003

JAMES E. ROGAN
*Director of the United States Patent and Trademark Office*